June 15, 1926.

A. L. FRENCH

FIFTH WHEEL FOR TRUCKS AND TRAILERS

Filed June 6, 1923

1,588,719

Inventor
Archey L. French,
By Hanks Ackerman
Attorney

Patented June 15, 1926.

1,588,719

UNITED STATES PATENT OFFICE.

ARCHEY L. FRENCH, OF MARSHALL, TEXAS.

FIFTH WHEEL FOR TRUCKS AND TRAILERS.

Application filed June 6, 1923. Serial No. 643,754.

This invention relates to couplings for trucks and trailers, and has for an object the provision of a novel fifth wheel for connecting the trailer to the truck, the said coupling being rigid in so far as its draft action is concerned, but permitting oscillatory motion of the truck or trailer independently of each other, the said coupling permitting universal movement at the joint in order that the truck and trailer may travel over uneven surfaces without undue strain on the coupling or other parts of the apparatus.

It is a further object of this invention to produce a coupling of the character indicated which can be detachably connected to a truck frame, the arrangement of parts being such that a king pin and ball which is associated with the bolster and truck frame may possess unusual strength and durability.

A still further object of this invention is to provide means to prevent undue movement of the bolster of the truck when unusually rough roads are encountered and there is undue pitch or movement of the trailer or truck.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
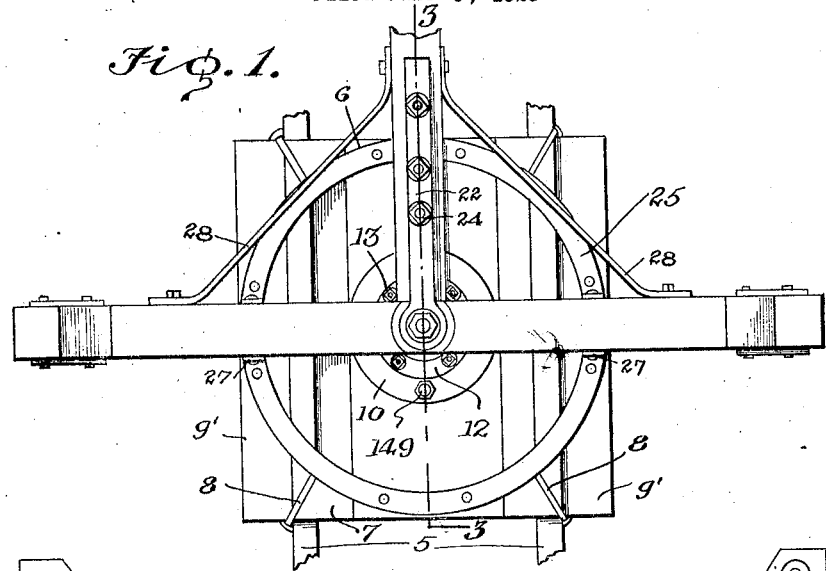
Figure 1 illustrates a plan view of the truck frame, with the fifth wheel embodying the invention applied thereto.
Figure 2:
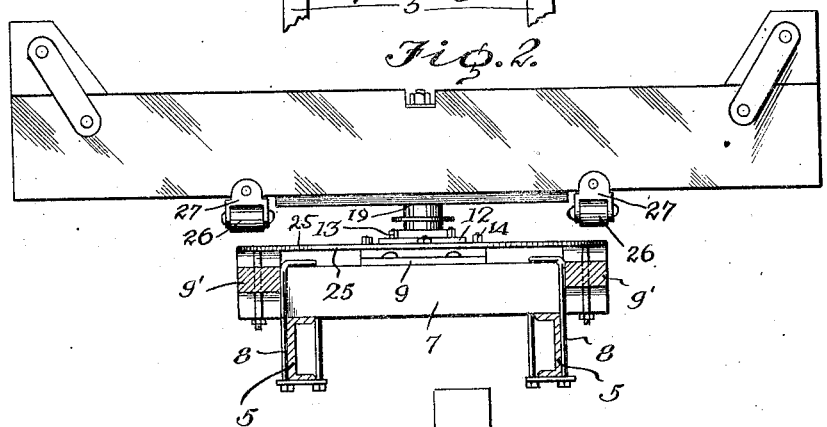
Figure 2 illustrates a view in elevation thereof.
Figure 3:
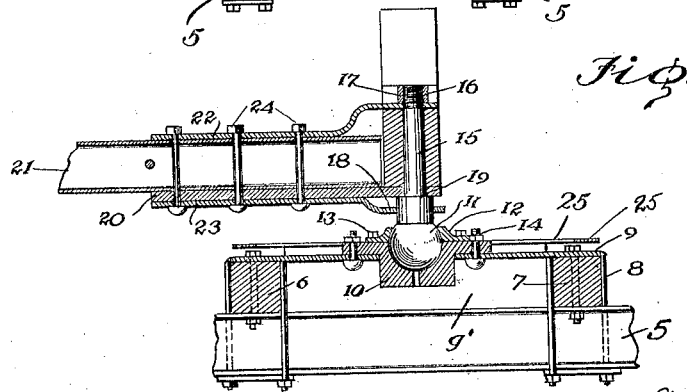
Figure 3 illustrates a sectional view on the line 3—3 of Fig. 1.

In these drawings, 5 denotes the side members of the truck frame to which two sill members 6 and 7 are secured by clips such as 8.

An apertured plate 9 is supported on the sills, and the said plate acts as a support for the bearing 10 in which the ball 11 is seated, the said ball being held on the bearing by a retaining plate 12 that is secured to the bearing by fastenings 13 such as bolts. The bearing is secured to the plate by fastenings 14, here shown as comprising bolts and nuts.

The ball 11 is formed integral with the king pin 15, and the said king pin and ball are preferably constructed of relatively strong material such as steel. The pin terminates in a threaded shank 16 that engages a nut 17 for retaining the king pin in the bolster 18.

The king pin has a reduced portion forming a shoulder 19 on which a reinforcing plate 20 is supported, the said reinforcing plate constituting a support for the coupling pole or connection 21 by which the trailer is attached to the truck.

Bracing plates 22 and 23 are superimposed on the coupling pole and the latter underlies the plate 20, and the parts are connected together by bolts 24, as fully shown in the drawing.

A circular plate 25 is supported on the plate 9, and on cross sills 9' at the ends of the sills 6 and 7, it being understood that the sills and cross sills may be secured together in any appropriate way. The circular plate is engaged by the anti-friction rollers 26 that are rotatably mounted in brackets 27 depending from the under surface of the bolster, and these rollers are intended to engage the circular plate in case undue motion is imparted to the bolster by undue movement of the trailer or the truck independently of each other.

The braces 22 and 23 are apertured to receive the king pin above and below the bolster and these serve to produce a relatively rigid structure.

Braces 28 are connected to the coupling pole and bolster and serve to insure a rigid structure and aid in maintaining the strength thereof.

I claim:

1. In a fifth wheel for a truck and trailer, a plate suitably supported on the frame of a truck, a bearing thereon, a king pin comprising a ball and an integral shank, the said ball being supported in the bearing, means for securing the ball in the bearing to permit universal movement thereof, a bolster mounted on the shank of the king pin, a shoulder between the ball and the end of the said shank of the king pin, a plate having an aperture to receive the shank supported on the said shoulder, a coupling supported by said plate and braces secured to said coupling and connected to the said king pin.

2. In a fifth wheel for a truck and trailer, a plate suitably supported on the frame of a truck, a bearing thereon, a king pin comprising a ball and an integral shank, the said ball being supported in the bearing, means for securing the ball in the bearing to permit universal movement thereof, a bolster mounted on the shank of the king pin, a shoulder between the ball and the end of the said shank of the king pin, a plate having an aperture to receive the shank supported on the said shoulder, a coupling supported by said plate, braces secured to said coupling and connected to the said king pin, a circular plate supported by the first mentioned plate, and rollers carried by the bolster adapted to engage said plate upon abnormal movement of the bolster with relation to the truck frame.

ARCHEY L. FRENCH.